United States Patent [19]
Panwar et al.

[11] Patent Number: 5,898,853
[45] Date of Patent: *Apr. 27, 1999

[54] APPARATUS FOR ENFORCING TRUE DEPENDENCIES IN AN OUT-OF-ORDER PROCESSOR

[75] Inventors: Ramesh Panwar, Santa Clara; Dani Y. Dakhil, Los Altos, both of Calif.

[73] Assignee: Sun Microsystems, Inc., Palo Alto, Calif.

[*] Notice: This patent is subject to a terminal disclaimer.

[21] Appl. No.: 08/882,173

[22] Filed: Jun. 25, 1997

[51] Int. Cl.$^6$ ..................................................... G06F 9/38
[52] U.S. Cl. .............................................................. 395/392
[58] Field of Search ..................................... 395/392, 394

[56] References Cited

U.S. PATENT DOCUMENTS

| | | | |
|---|---|---|---|
| 5,134,561 | 7/1992 | Liptay | 395/425 |
| 5,487,156 | 1/1996 | Popescu et al. | 395/375 |
| 5,546,597 | 8/1996 | Martell et al. | 395/800 |
| 5,560,032 | 9/1996 | Nguyen et al. | 395/800 |
| 5,561,776 | 10/1996 | Popescu et al. | 395/375 |
| 5,625,789 | 4/1997 | Hesson et al. | 395/394 |
| 5,625,837 | 4/1997 | Popescu et al. | 395/800 |
| 5,745,726 | 4/1998 | Shebanow et al. | 395/392 |
| 5,745,780 | 4/1998 | Phillips et al. | 395/392 |
| 5,748,934 | 5/1998 | Lesartre et al. | 395/392 |
| 5,751,984 | 5/1998 | Chang et al. | 395/394 |

OTHER PUBLICATIONS

Popescu et al., *The Metaflow Architecture*, IEEE Micro, 1991, pp. 10–13, and 63–73.

Huang et al., *An extended Classification of Inter–Instruction Dependency and Its Application in Automatic Synthesis of Pipelined Processors*, IEEE 1993, pp. 236–246.

*Primary Examiner*—Richard L. Ellis
*Attorney, Agent, or Firm*—James A. Pinto; William J. Kubida; Holland & Hart LLP

[57] ABSTRACT

In a processor executing instructions speculatively or out-of-order, a dependency table tracks instruction dependencies between a current instruction and a live instruction. The table contains an instruction identifier and the destination register specified by the live instruction. The table can also contain information about the age of the entry, the validity of the entry, and the process which the entry is associated. A dependency between instructions is determined by one or more comparators comparing the destination register to the source registers of the current instruction. True dependencies are distinguished from false dependencies using the age information, the validity information, and the process information.

18 Claims, 6 Drawing Sheets

APPARATUS FOR ENFORCING TRUE DEPENDENCIES IN AN OUT-OF-ORDER PROCESSOR

CROSS-REFERENCE TO RELATED APPLICATIONS

The subject matter of the present application is related to that of co-pending U.S. patent application Ser. No. 08/881,958 filed Jun. 25, 1997 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 filed Jun. 25, 1997 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 filed Jun. 24, 1997 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 filed Jun. 25, 1997 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/881,145 filed Jun. 25, 1997 for APPARATUS FOR DYNAMICALLY RECONFIGURING A PROCESSOR filed concurrently herewith by Ramesh Panwar and Ricky C. Hetherington; Ser. No. 08/881,732 filed Jun. 24, 1997 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Charridani; Ser. No. 08/882,175 filed Jun. 25, 1997 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 filed Jun. 25, 1997 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 filed Jun. 25, 1997 for APPARATUS FOR TRACKING PIPELINE RESOURCES IN A SUPERSCALAR PROCESSOR filed concurrently herewith by Ramesh Panwar; Ser. No. 08/882,525 filed Jun. 25, 1997 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 filed Jun. 25, 1997 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 filed Jun. 25, 1997 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 filed Jun. 24, 1997 for NON-BLOCKING HIERARCHICAL CACHE THROTTLE filed concurrently herewith by Ricky C. Hetherington and Thomas M. Wicki; Ser. No. 08/881,727 filed Jun. 25, 1997 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 filed Jun. 24, 1997 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 filed Jun. 24, 1997 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

This invention relates in general to microprocessors, and more particularly, to microprocessor architectures and methods for detecting true dependencies between instructions in a processor.

2. Relevant Background

Modern computer processors (also called microprocessors) utilize various design techniques for enhancing the speed and overall performance of the processor. Speculative instruction execution is one such technique wherein a branch prediction unit predicts the outcome of a branch instruction, thereby allowing the instruction fetch unit to fetch subsequent instructions according to the predicted outcome. These instructions are then "speculatively" processed and executed to allow the processor to make forward progress during the time branch instruction is resolved.

Out-of-order instruction processing is another performance-enhancing technique in which instructions are processed in parallel in multiple pipelines so long as there are no data or register dependencies between the instructions in each pipeline. If a second instruction has a dependency on a first instruction, then the dependent second instruction must be executed after the first instruction to ensure proper program operation.

To reap significant benefits from speculative instruction execution or out-of-order instruction execution, the processor has to be able to detect dependencies between instruction, and avoid "false" dependencies if no dependency exists in fact.

As an example of a dependency, consider the following two instructions: (underlines indicates a register dependency).

add r1, r2, r3
load r3, r4, r5

In this example, the load instruction specifies the source registers r3 and r4. Because the add instruction specifies a destination register of r3, the load instruction is dependent upon the completion of the add instruction.

While the processor should be capable of detecting the apparent dependencies between instructions, false dependencies between instructions must be avoided, such as an apparent dependency between a current instruction and an instruction which originated from a mispredicted branch.

What is needed is an apparatus and method for detecting dependencies and distinguishing between true and false dependencies in a processor speculatively executing instructions out-of-order.

SUMMARY OF THE INVENTION

The above problems have been solved by the apparatus of the present invention for identifying and tracking instruction dependencies.

In one embodiment of the invention, a processor has a dependency table storing dependency information of older "live" instructions in the processor, and a comparator comparing the source registers of an incoming instruction to the destination register of the incoming instruction. The information in the table comprises an instruction identifier identifying the live instruction, and a destination register identifier identifying the destination register of the live instruction. The comparator compares the destination register identifier of the live instruction to the source registers of the incoming instruction, and indicates a dependency of the incoming instruction upon the live instruction if the destination register identifier corresponds to the source registers of incoming instruction.

Associated with each entry in the table is also the relative "age" of the instruction which is based on the order in which the instructions were fetched from the instruction cache. The youngest entry in the table that matches the register specified by the incoming instruction is a true dependency of the incoming instruction.

If a branch misprediction occurs, the entries in the table following the mispredicted instruction are flushed, and the youngest entries in the table prior to the misprediction are restored.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention utilizes a dependency table and one or more comparators for determining true dependencies between an incoming instruction and an older instruction within the processor. True dependencies are distinguished from false or apparent dependencies so that speculative or out-of-order instruction execution can be used within the processor. The present invention is described with reference in particular to FIGS. 3 to 6.

Figure 1:
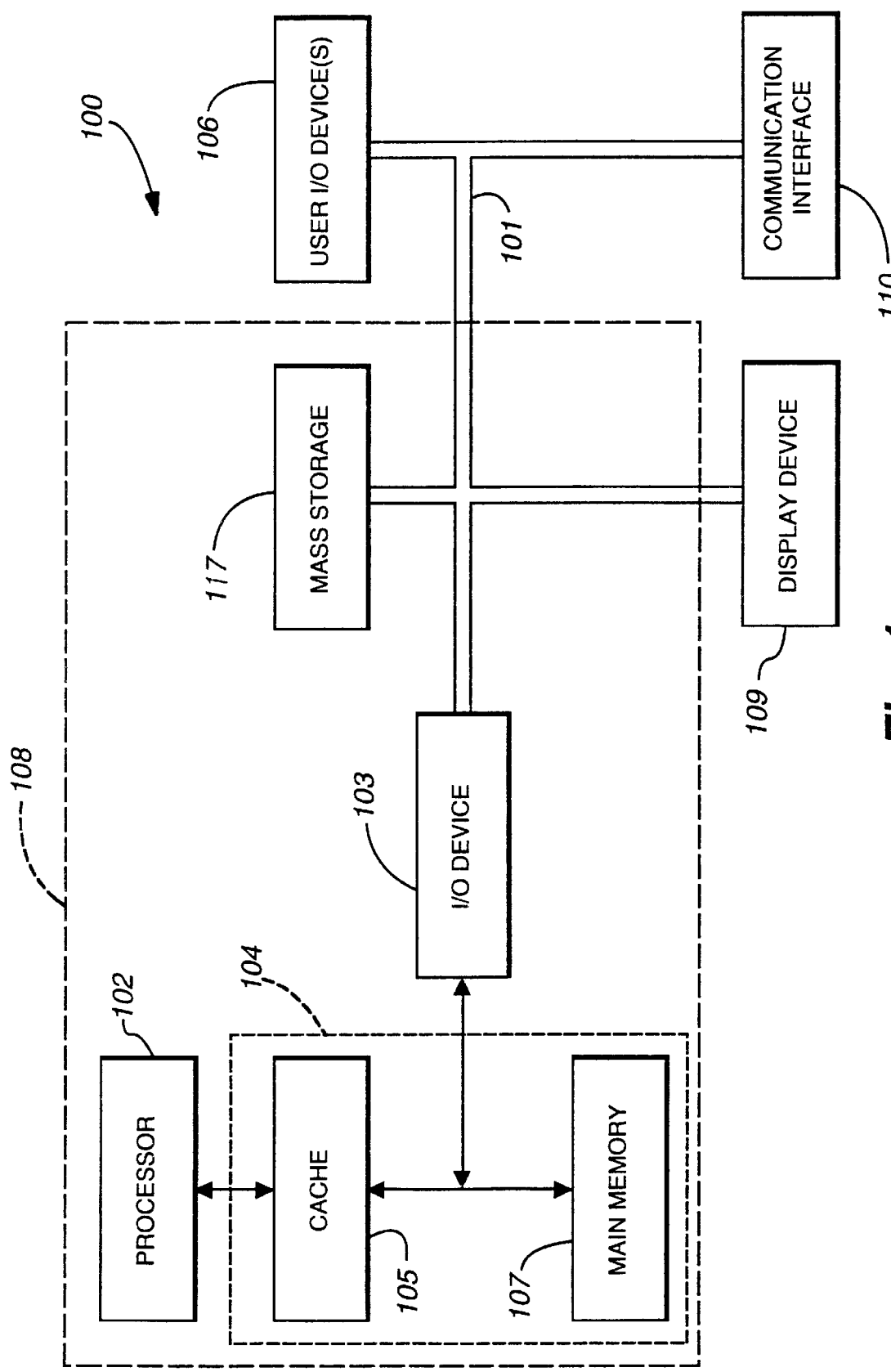
FIG. 1 shows in block diagram form a computer in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
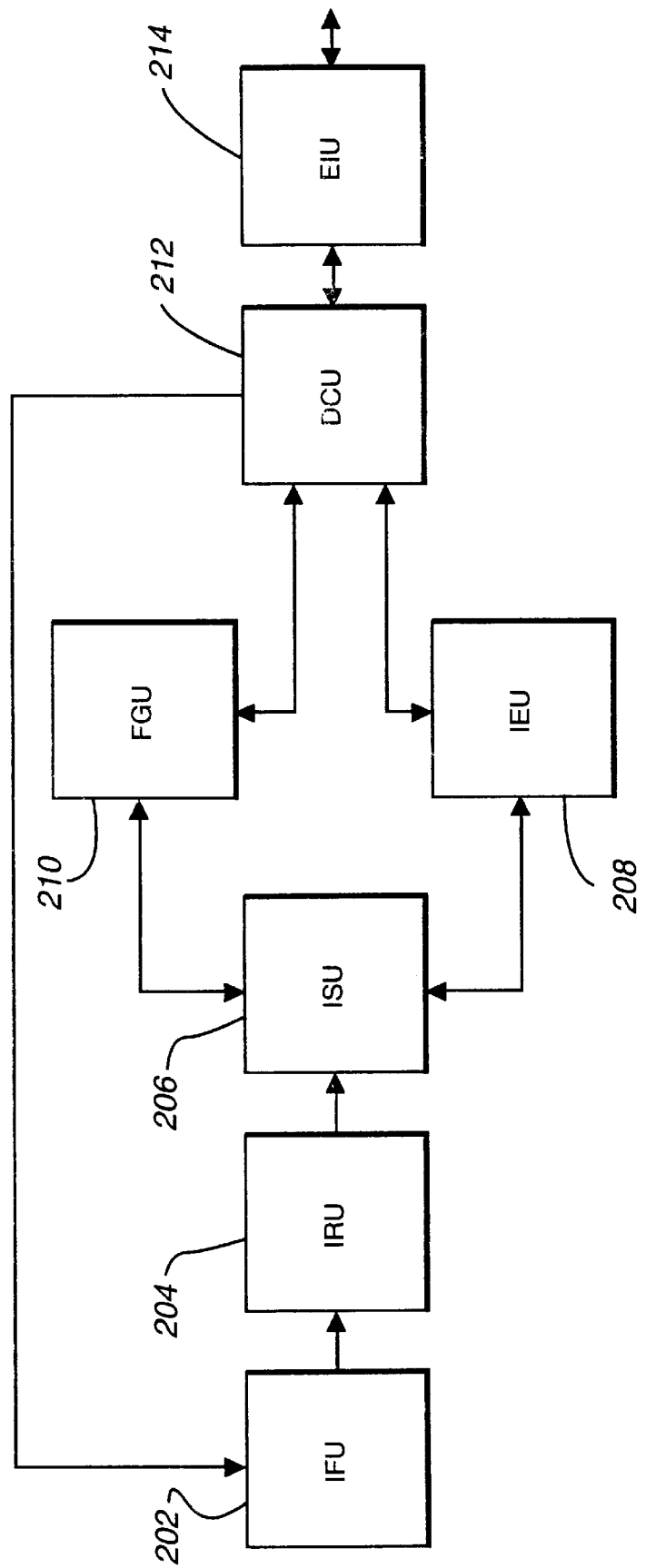
FIG. 2 shows a processor in block diagram in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle—known as an instruction bundle. Any number of instructions may be included in a bundle to meet the needs of a particular application.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address. If a branch is mispredicted, the instructions processed following the mispredicted branch are flushed from the processor, and the process state is restored to the state prior to the mispredicted branch.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms, described below, that analyze the instructions to determine if the operands (identified by the instructions' register specifiers) cannot be determined until another "live instruction" has completed. The term "live instruction" as used herein refers to any instruction that has been fetched from the instruction cache, but has not yet completed or been retired.

IRU 204 outputs renamed instructions to instruction scheduling unit (ISU) 206, and indicates any dependency which the instruction may have on other prior or older live instructions. As will be discussed below with reference to FIGS. 3–6, IRU 204 contains mechanisms to detect dependencies and distinguish between true and false dependencies.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating-point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double-precision architectural registers as well as single and/or double-precision rename registers.

The floating point graphics and execution unit FGU 210 includes one or more pipelines, each comprising one or more stages that implement floating-point instructions. FGU 210 also includes mechanisms for holding the results and state of speculatively executed floating-point and graphic instructions. FGU 210 functions to perform final decoding of floating-point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating-point unit (FPU) in designs in which special purpose graphic and multimedia instructions are not used. FGU 210 preferably includes mechanisms to access single and/or double-precision architectural registers as well as single and/or double-precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

The apparatus and method for determining true dependencies between two or more instructions in accordance with the present invention is implemented primarily in the instruction renaming unit IRU 204, and will be described in detail with reference to FIGS. 3 to 6.

Each instruction in an incoming instruction bundle will have up to three register specifiers or fields, a first source register (rs1), a second source register (rs2), and a destination register (rd). In accordance with the present invention, to determine dependencies of an incoming instruction in the bundle, the source registers of the instruction are compared to the destination registers of prior or older live instructions maintained in a dependency table.

If the destination register of an entry in the table matches either of the source registers of the incoming instruction, then the live instruction referenced by the dependency table is said to be a "producer" for the incoming instruction. In this sense, the incoming instruction has a dependency—either real or false—upon the producing instruction.

A false dependency exists where an incoming instruction is falsely believed to be dependent on an older instruction, an instruction from another process, or a speculatively executed instruction which was a part of a mispredicted branch.

In order to distinguish between a real and false dependency, the present invention tracks only the most recent (i.e., "youngest") producer for a particular source register of an instruction in the processor. This is because the dependencies upon much older instructions will already be resolved by the time the present instruction is executed. However, the dependencies between the present instruction and the youngest producing instruction should be tracked throughout the machine to insure that the youngest producing instruction is executed prior to the present dependent instruction.

The present invention also associates process identification information with each producer of a destination register. The present invention also provides for removal of entries from the table if the entries followed a mispredicted branch instruction.

Figure 3:
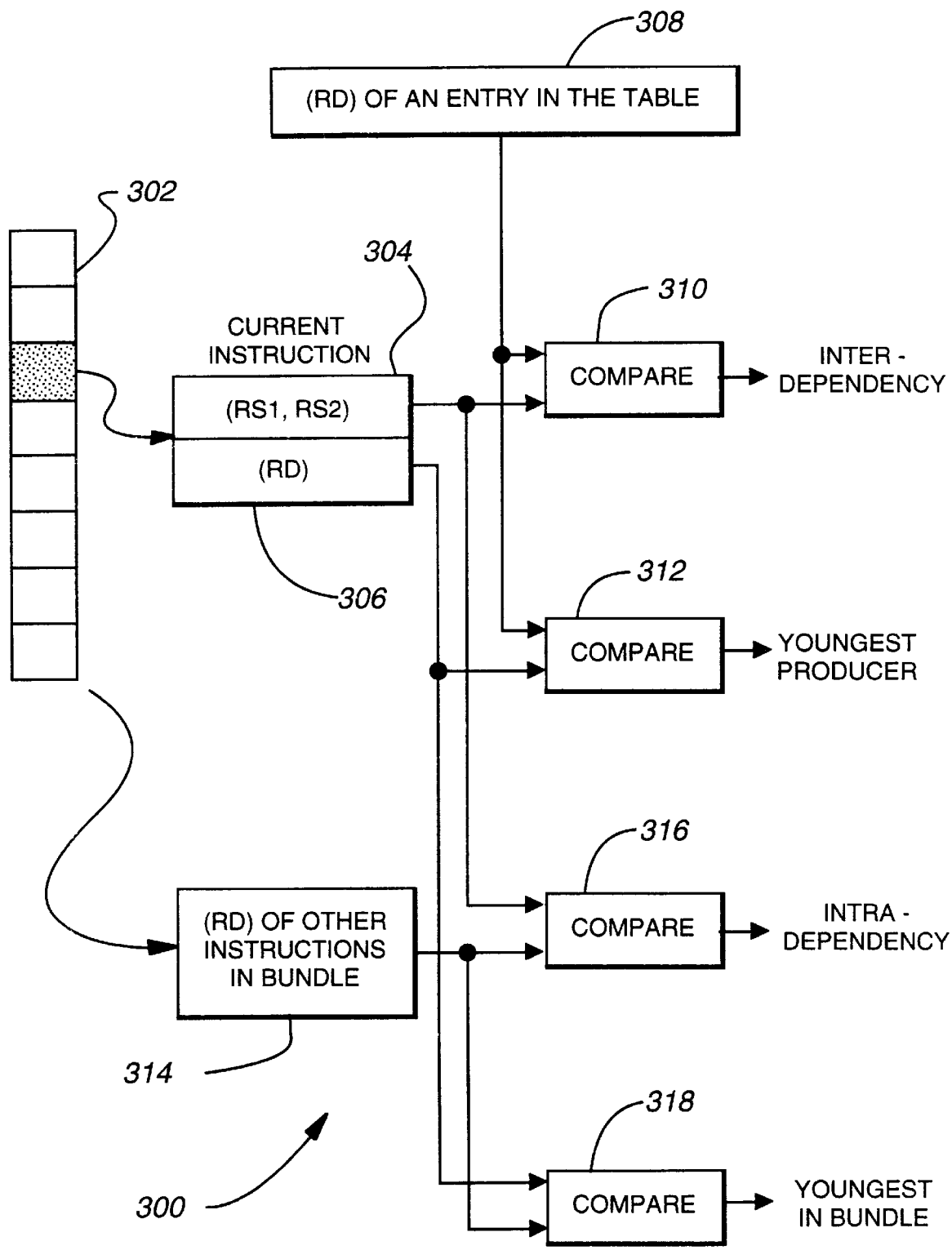
FIG. 3 illustrates a block diagram of dependency-checking module or logic 300 in accordance with the present invention.

Referring to FIG. 3, dependency module 300 checks for dependencies between the source registers 304 of an instruction from bundle 302, and the destination registers 308 of "live" instruction entries contained in the dependency table. This comparison is made through comparator 310. The destination registers 308 from the dependency table are only considered as possible dependencies if they have been marked with a youngest bit indicating that they are the youngest producer of a value for a specified destination register.

The destination register 306 of the current instruction is also compared through comparator 312 to the destination registers in the dependency table which have been marked youngest. If there is a match of destination registers through comparator 312, then the current instruction is the youngest producer of the specified destination register and is marked as such when it is entered in the table.

Optionally, intra-bundle dependencies can be determined through comparators 316 and 318. The source registers 304 of the current instruction can be compared to the destination registers of the other older or prior instructions in the bundle, through comparator 316, to determine any intra-bundle dependencies. Likewise, comparator 318 determines within the bundle the youngest producer of a register value by comparing the destination registers 306 of the current instruction to the destination registers 314 of other instructions in the bundle.

Depending upon the particular implementation chosen, the comparison made by comparators 316 or 318 can be performed in order to reduce the number of comparisons to entries in the table. However, if an intra-bundle dependency comparison is not made, the dependencies between the current instruction and the other instructions in the bundle will be detected by comparators 310 and 312 using the entries from the dependency table.

Figure 4:
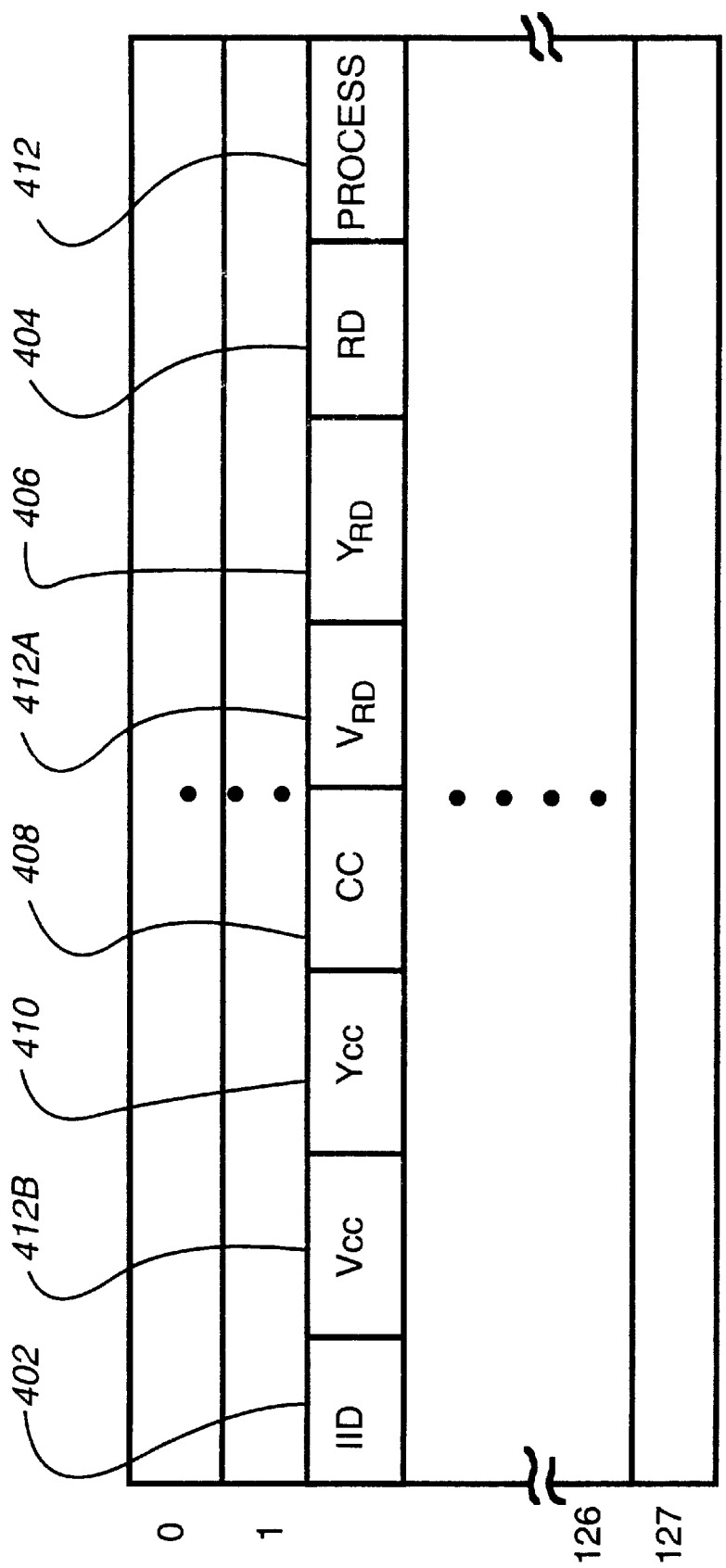
FIG. 4 illustrates a dependency table in accordance with the present invention.

FIG. 4 illustrates the dependency table 400 in accordance with the present invention. Table 400 is shown with 128 entries which corresponds to the total number of possible live instructions in the processor at any one time. As mentioned above, a "live" instruction means an instruction which has been fetched, but has not yet been retired.

In accordance with the present invention, the size of the dependency table is proportionate to the number of live instructions in the machine, as opposed to the total number of registers which exist in the machine. In this manner, the present invention offers an efficient manner of tracking dependencies, despite the processor's ability to be dynamically reconfigured into two or more processors executing independent processes, discussed below.

The table 400 can be implemented as an inverted map table in one embodiment of the invention. The table is inverted in the sense that each table entry corresponds to a rename register and the content of the entry is the architectural register that maps to the rename register. A non-inverted table can be used where each entry corresponds to an architectural register and the content of the entry is the rename register that maps to the architectural register. An inverted map table provides several advantages over a non-inverted table. The scaleable processor architecture SPARC specifies a large number of architectural registers arranged as register windows, and therefore maintaining a non-inverted map table would imply a much larger table. Moreover, inverted mapping permits the implementation of multiple strands or virtual processors on the same die without increasing the table size. With a non-inverted table, the number of table entries would be proportional to the number of strands. Furthermore, the inverted table allows single-cycle rename state recovery on branch mispredicts using the youngest bit.

In an embodiment of the invention, table 400 is arranged to reflect the relative ages of the instructions. The oldest entries are located near the beginning of the table (i.e., entry number one) and as subsequent instructions are fetched, their entries are placed toward the end of the table (i.e., younger instructions are placed in rows after the older instructions).

Each entry in the table has an instruction identification (IID) field 402 which uniquely identifies the instruction within the processor. The IID field 402 can be a unique identifier or merely a value corresponding to the position of the instruction within table 400.

Each entry in the table also has a field 404 which identifies the destination register associated with the particular instruction of the entry. In one embodiment of the invention, the field 404 contains the physical address of the destination register affected by the instruction. A "youngest" field or bit 406 is also provided to indicate, when set, that the entry is the youngest instruction to produce a value to the destination register specified in field 404.

In this manner, when an incoming instruction compares its source registers to the destination registers contained within the dependency table, an entry in the dependency table will only become the producer of the present incoming instruction if there is a match of the destination register and the youngest bit for that entry in the table is set.

Further, when a new instruction entry is placed in the dependency table for purposes of dependency checking against future incoming instructions, if the new entry in the dependency table writes to the same destination register as the current youngest producer of that destination register in the table, then the newest entry is flagged as the youngest producer of that destination register and the youngest bit of the prior producer is cleared. Hence, the youngest producer of a particular destination register (or a condition code register) will be maintained within the dependency table.

Some instructions can produce results into particular condition code registers. For example, "ADDC r1, r3, r4" will produce results into register r4 and the carry bit of the condition code register. A field 408 is provided for identifying the condition code registers affected by the instruction entry. In one embodiment of the invention, field 408 contains the physical address of the particular condition code register affected. A "youngest" field or bit 410 is associated with field 408 indicating, when set, that this instruction is the youngest producer of a result into the register specified by field 408.

While the dependency table is shown with entries for tracking the youngest instruction affecting multiple destination registers or condition code registers, it is understood that this table could be adapted to track dependencies among other register within the processor without departing from the scope of the present invention.

A process field 412 can also be provided to identify each entry or instruction in table 400 with a unique process running within the processor. Process field 412 is particularly useful where the processor 102 can be dynamically reconfigured into multiple processors running separate and independent programs. For instance, if the processor is capable of being configured into four different processors, a two-bit identification field can be used to associate each live instruction in the dependency table with its corresponding process. By providing process field 412, only dependencies which relate to the same process as the incoming instruction being detected as true dependencies. Dependencies would not be detected between instructions of different processes, thereby eliminating false dependencies from the dependency module 300.

Further, a valid field or bit 412 can be included in table 400 for indicating if the entry is a valid entry which should be used for dependency checking. The valid field 412 is associated with each destination register listed for the entry. In FIG. 4, the valid field 412A is associated with the destination field 404, while the valid field 412B is associated with the condition code destination register 408. The valid field is a way of accounting for an entry in the table which was based on an instruction following a mispredicted branch instruction. As will be explained with reference to FIG. 6, when a branch misprediction is detected, the instructions after the mispredicted branch need to be flushed from the processor Any entry in table 400 can be flushed by clearing the valid bit, thereby indicating that the entry should not be used for determining dependencies against new incoming instructions.

In operation, if an instruction in the dependency table produces results into the first or second source register of an incoming instruction, then the incoming instruction is marked as dependent upon the instruction identified within the table. The instruction referenced within the table is referred to as the producing instruction and its instruction identification is then associated with the incoming instruction as a "producer identification" (PID). As discussed above, since there are three possible dependencies for each incoming instruction, there are three possible PIDs for every incoming instruction. However, it will be understood that some instructions may have less than three dependencies.

The PID is associated with the dependent instruction and passed downstream within the processor so that the instruction scheduling unit will schedule for execution the producing instruction before the dependent instruction. Once the producing instruction has executed and is retired, the entry in the dependency table corresponding to the instruction is removed from the table, and the instruction dependent on that entry can be executed.

Figure 5:
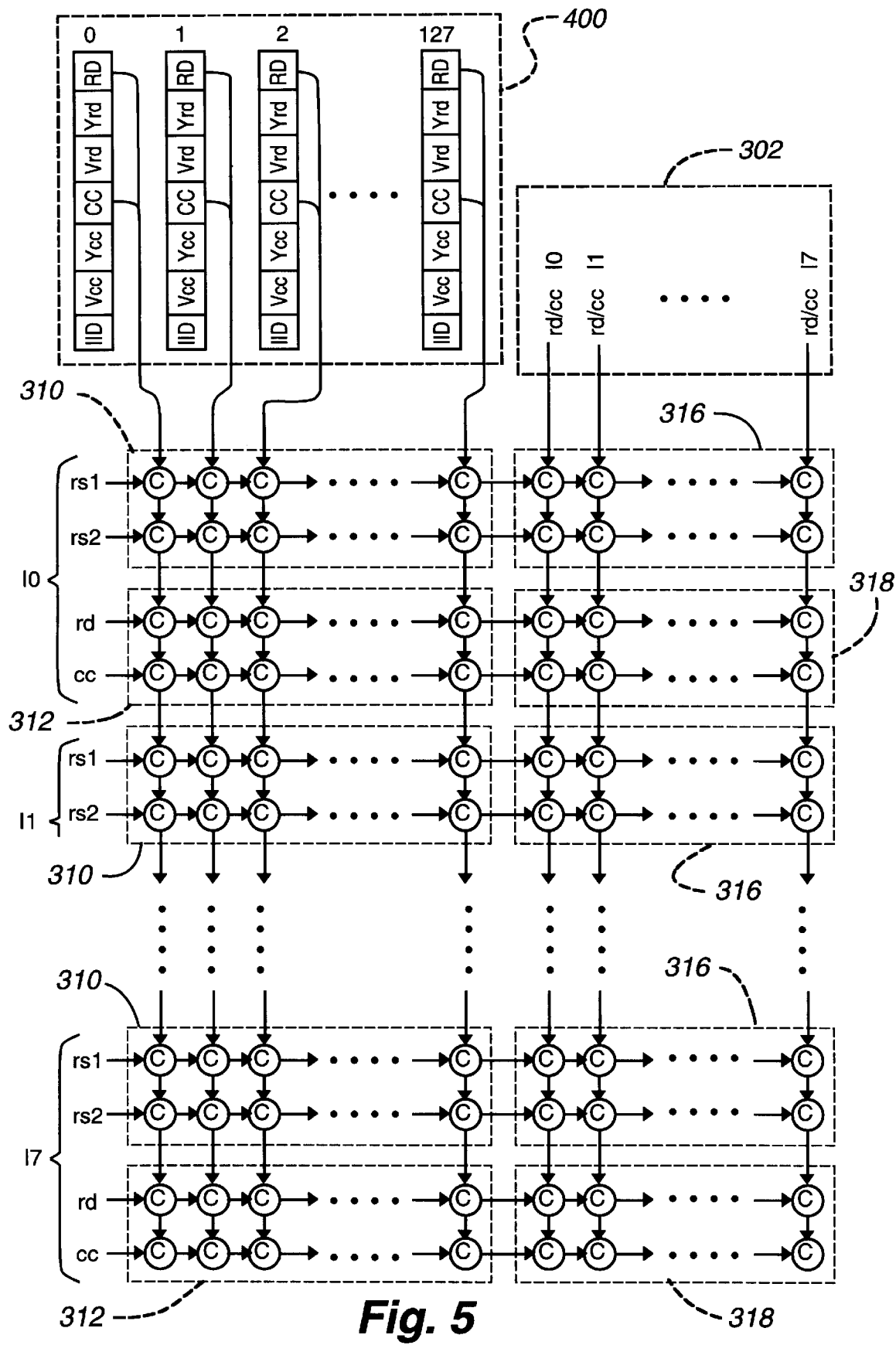
FIG. 5 illustrates an embodiment of the dependency-checking logic in accordance with the present invention.

FIG. 5 illustrates an embodiment of the present invention showing an arrangement or matrix of comparators comparing the registers from each instruction in a bundle to the entries of the dependency table 400 as well as other entries from the bundle 302. The sets of individual comparators shown in FIG. 5 correspond to the comparators 310, 312, 316, and 318 shown in FIG. 3. The comparator set 310 determines dependencies against entries in table 400, while comparator set 312 determines if the incoming instruction becomes the youngest producer of a particular destination register. Comparator set 316 determines intra-bundle dependencies, while comparator set 318 determines which instruction in the bundle is the youngest producer of a particular destination register.

It should be noted that an instruction should not be dependent on a future instruction, and therefore the dependency module 300 should only compare an instruction in the bundle against entries in the table and other older instructions in the bundle. With respect to intra-bundle dependency checks, the nth instruction in the bundle can be possibly dependent on only prior or older instructions in the bundle (i.e., 0 to (n−1)). For instance, the third instruction in the bundle can only possibly be dependent on the first and second instructions in the bundle.

While the matrix shown in FIG. 5 shows a comparison between the first instruction in the bundle (I0) against I0, I1, . . . I7 of block 302, it is understood that the results from these comparators should be ignored. Likewise, the second instruction in the bundle (I1) should only be compared for dependencies against I0 of block 302. The results from the comparators comparing I1 to I1, . . . I7 should be ignored.

Figure 6:
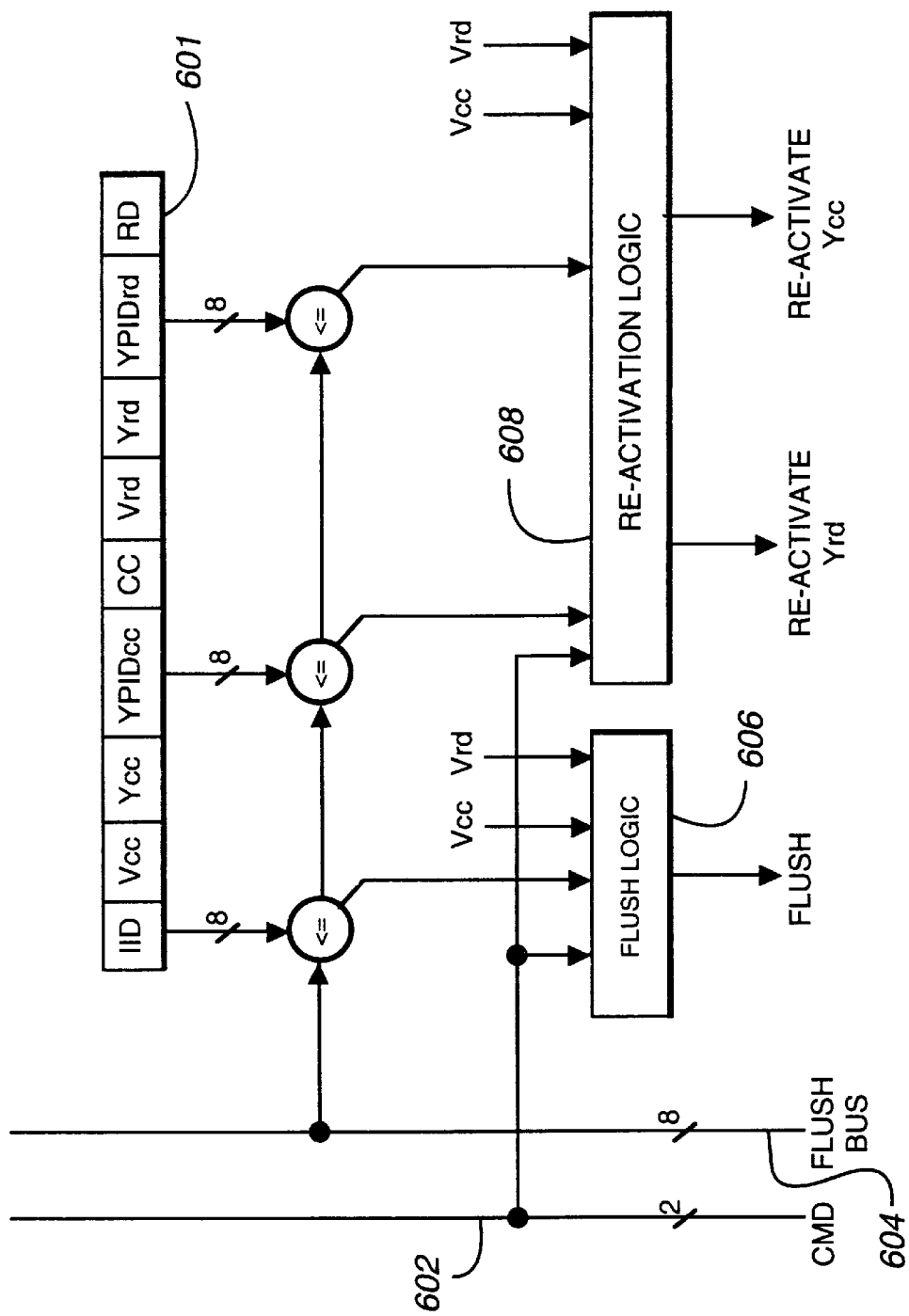
FIG. 6 illustrates a block diagram of the flushing logic to flush from the dependency table any instructions that followed a mis-predicted branch.

With reference to FIG. 6, a mechanism 600 is shown for flushing instruction from the dependency table 400. Instructions that follow a mis-predicted branch need to be flushed from the dependency checker so that dependencies are not falsely detected against mispredicted instructions.

Upon the detection of a branch misprediction, any entry in the dependency table is flushed if its instruction identification (IID) is greater than or equal to the identification of the mis-predicted branch (i.e., an instruction is flushed from the table if it is younger than the mispredicted branch instruction). Flushing an entry is executed by turning off the valid bits of the entry. FIG. 6 shows a two-bit command bus 602 used for removing the entry from table 400. A FLUSH command can be used to flush entries from the table. A valid entry 601 in the table is flushed by the flush logic 606 if its instruction identification (IID) is greater than or equal to a flush I.D. which appears on the flush bus 604.

An entry which is not flushed (i.e., still marked as valid) can be reactivated as the youngest producer by activating the corresponding Y-bit through the reactivation logic. The reactivation logic 608 determines the youngest instruction remaining in the table which produces a result into a particular destination register.

While the invention has been particularly shown and described with reference to a preferred embodiment thereof, it will be understood by those skills in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. A processor executing a first instruction and a second instruction, said first instruction specifying at least a destination register, said second instruction specifying a first source register, a second source register, and a destination register, the processor comprising:
a table storing dependency information regarding said first instruction, said information comprising an instruction identifier identifying said first instruction, a destination register identifier identifying said destination register of said first instruction, and a process identifier associated with said first instruction indicating which of a number of independent processes generated said first instruction; and
a comparator comparing said destination register identifier of said first instruction to said first and second source registers of said second instruction, said comparator indicating a dependency of said second instruction upon said first instruction if said destination register identifier corresponds to said first or second source registers of said second instruction.

2. The processor of claim 1, wherein said information stored in said table further comprises:
a youngest identifier indicating said first instruction is the youngest instruction most recently stored in the table which will produce a result into the destination register identified by said destination register identifier.

3. The processor of claim 1, wherein said information stored in said table further comprises:
a valid identifier indicating that said first instruction is a valid entry in the table.

4. The processor of claim 1, wherein said destination register identifier specifies a physical address of said destination register.

5. The processor of claim 1, wherein said comparator further comprises:
a first comparator comparing said destination register identifier of said first instruction to said first source register of said second instruction, said first comparator indicating a dependency of said second instruction upon said first instruction if said destination register identifier corresponds to first source register of said second instruction.

6. The processor of claim 5, wherein said comparator further comprises:
a second comparator comparing said destination register identifier of said first instruction to a said second source register of said second instruction, said second comparator indicating a dependency of said second instruction upon said first instruction if said destination register identifier corresponds to said second source register of said second instruction.

7. The processor of claim 1, wherein said table has n rows, each row storing dependency information regarding one of n instructions, where n corresponds to a total number of live instructions within the processor.

8. The processor of claim 7, wherein n is independent of a total number of architectural registers in the processor.

9. The processor of claim 1, wherein said destination register identifier corresponds to a condition code register.

10. The processor of claim 1, further comprising:
a second comparator comparing said destination register identifier of said first instruction to said destination register of said second instruction, said second comparator indicating that said second instruction is the younger instruction which will produce a result into the destination register identified by said destination register identifier.

11. The processor of claim 1, further comprising:
an intra-bundle dependency comparator comparing said first and second source registers of said second instruction to a destination register of a preceding instruction in a bundle of instructions, said intra-bundle dependency comparator indicating a dependency of said second instruction upon said preceding instruction if said destination register of said preceding instruction corresponds to said first or second source registers of said second instruction.

12. A computer system comprising:
a memory system;
a processor coupled to said memory system, the processor executing a first instruction and a second instruction, said first instruction specifying at least a destination register, said second instruction specifying a first source register, a second source register, and a destination register, the processor comprising:
a table storing dependency information regarding said first instruction, said information comprising an instruction identifier identifying said first instruction, a destination register identifier identifying said destination register of said first instruction, and a process identifier associated with said first instruction indicating which of a number of independent processes generated said first instruction; and
a comparator comparing said destination register identifier of said first instruction to said first and second source registers of said second instruction, said comparator indicating a dependency of said second instruction upon said first instruction if said destination register identifier corresponds to said first or second source registers of said second instruction.

13. The computer system of claim 12, wherein said information stored in said table further comprises:
a youngest identifier indicating said first instruction is the youngest instruction most recently stored in the table which will produce a result into the destination register identified by said destination register identifier.

14. The computer system of claim 12, wherein said information stored in said table further comprises:
a valid identifier indicating that said first instruction is a valid entry in the table.

15. The computer system of claim 12, wherein said destination register identifier specifies a physical address of said destination register.

16. The computer system of claim 12, wherein said comparator further comprises:
a first comparator comparing said destination register identifier of said first instruction to said first source register of said second instruction, said first comparator indicating a dependency of said second instruction upon said first instruction if said destination register identifier corresponds to first source register of said second instruction.

17. The computer system of claim 16, wherein said comparator further comprises:

a second comparator comparing said destination register identifier of said first instruction to a said second source register of said second instruction, said second comparator indicating a dependency of said second instruction upon said first instruction if said destination register identifier corresponds to said second source register of said second instruction.

18. The computer system of claim 12, wherein said table has n rows, each row storing dependency information regarding one of n instructions, where n corresponds to a total number of live instructions within the processor.

* * * * *